United States Patent [19]

McLoughlin et al.

[11] 4,357,034
[45] Nov. 2, 1982

[54] SAFETY BAR FOR FIRE TRUCKS

[75] Inventors: John McLoughlin, 92 Mobrey La., Smithtown, N.Y. 11787; Neocles Athanasiades, Setauket, N.Y.

[73] Assignee: John McLoughlin, Smithtown, N.Y.

[21] Appl. No.: 184,352

[22] Filed: Sep. 5, 1980

Related U.S. Application Data

[63] Continuation-in-part of Ser. No. 10,178, Feb. 7, 1979, Pat. No. 4,273,360.

[51] Int. Cl.$^3$ .............................................. B60R 21/10
[52] U.S. Cl. ..................................... 280/751; 296/1 R
[58] Field of Search ....................... 280/748, 762, 751; 180/268, 271; 296/1 R, 183; 297/487, 488; 403/57, 58; 49/386, 396, 364; 16/287

[56] References Cited

U.S. PATENT DOCUMENTS

| 296,975 | 4/1884 | Lampton | 297/488 |
|---|---|---|---|
| 1,224,353 | 5/1917 | Bacho | 49/386 X |
| 1,533,378 | 4/1925 | Bunkers | 49/386 |
| 2,796,619 | 6/1957 | Hammer | 403/58 X |
| 3,623,756 | 11/1971 | Fischer | 403/57 X |
| 3,899,042 | 8/1975 | Bonar | 297/487 |

FOREIGN PATENT DOCUMENTS 616890 4/1980 Switzerland ..................... 280/748

Primary Examiner—Robert J. Spar
Assistant Examiner—Donald W. Underwood
Attorney, Agent, or Firm—James P. Malone

[57] ABSTRACT

Safety bar for vehicles, such as fire trucks. A base member is mounted on a permanent frame of the vehicle. A connecting member is pivotally mounted on the base member for rotation in a first plane. A bar is pivotally mounted on the connecting member for rotation in a second plane perpendicular to the first plane. The connecting member can rotate at one direction from a stop position against the base member and the bar can only rotate at one direction from a stop position against the connecting member. The safety bar has a spring connected to hold the bar and connecting members in stop position.

2 Claims, 4 Drawing Figures

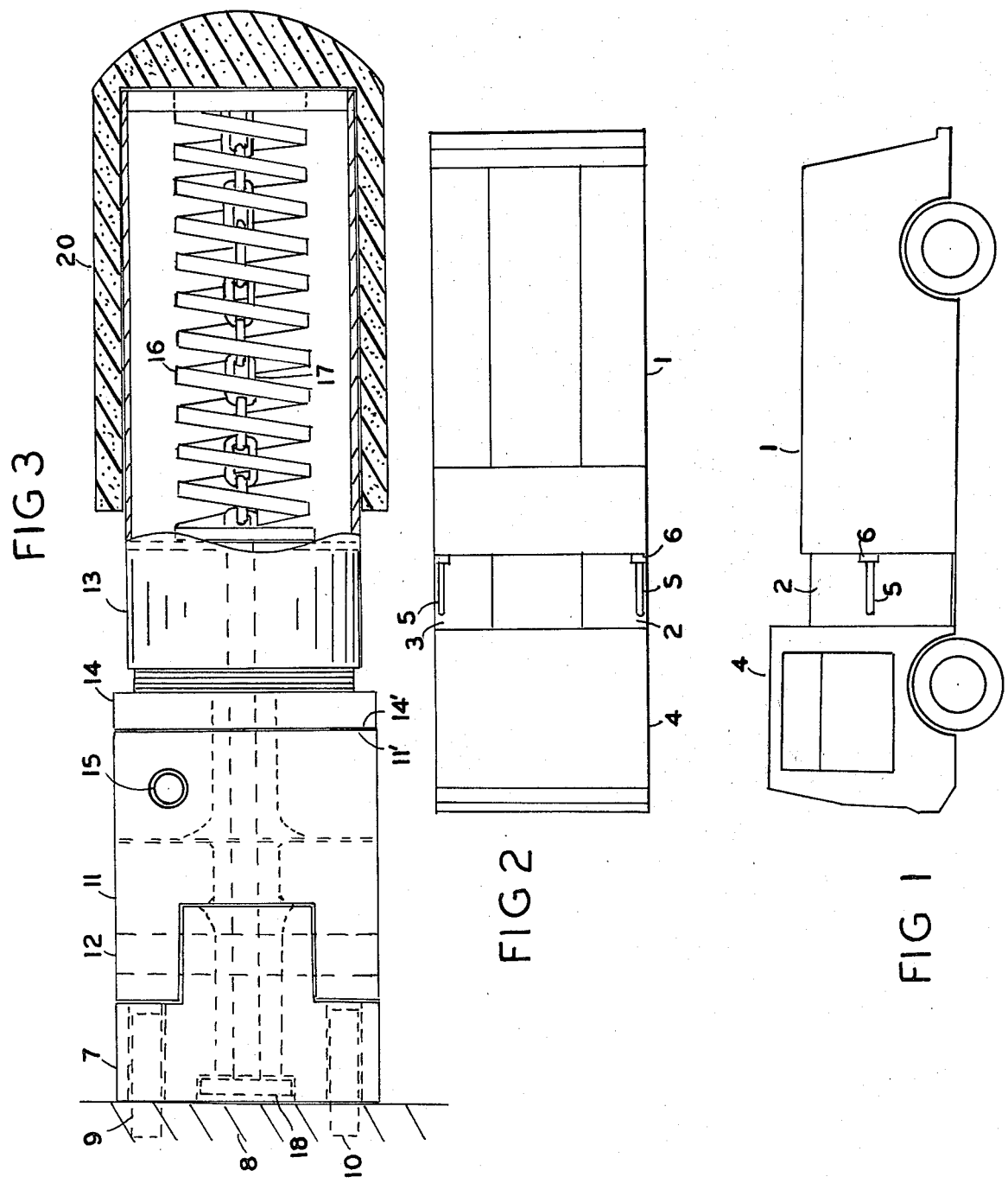

SAFETY BAR FOR FIRE TRUCKS

This application is a continuation-in-part of Ser. No. 010,178, filed Feb. 7, 1979, entitled "SAFETY BAR FOR FIRE TRUCKS," now U.S. Pat. No. 4,273,360 granted June 16, 1981.

TECHNICAL FIELD

This invention relates to safety bar means, for instance, for vehicles such as fire trucks of the type having an open enclosure on each side behind the cab for carrying firemen.

BACKGROUND ART

Many fire trucks have a space on each side behind the cab for carrying firemen. These spaces are open to the outside and have no doors or other form of protection to prevent the firemen from falling out or being ejected when the truck is making a turn.

THE INVENTION

The present invention solves this problem by providing a safety bar which extends across this space. The bar is spring loaded and is swiveled and mounted so that it can be rotated only upwardly and inwardly. It is restrained from movement out or down with respect to the truck.

OBJECTS OF THE INVENTION

Accordingly, a principal object of the invention is to provide new and improved safety bar means for fire trucks of the type having an open enclosure behind the cab on each side for carrying firemen.

Another object of the invention is to provide new and improved safety bar means for a fire truck of the type having an open space behind the cab for carrying firemen comprising, a bar to protect men from falling out from said space, means to mount the bar to extend across the space and for movement upwardly and inwardly with respect to the truck, and means to restrain the bar from movement downwardly from horizontal position and/or outwardly with respect to the truck.

Another object of the invention is to provide new and improved safety bar comprising, a base member adapted to be mounted on a permanent frame, a connecting member pivotally mounted on the base member for rotation in a first plane, a bar pivotally mounted on the connecting member for rotation in a second plane perpendicular to the first plane.

These and other objects of the invention will be apparent from the following specification and drawings.

BRIEF DESCRIPTION OF THE DRAWINGS

FIG. 1 is a side view illustrative of the use of the invention.

FIG. 2 is a top view of FIG. 1.

FIG. 3 is a side view of an embodiment of the invention partially in section.

BEST MODE OF THE INVENTION

Figure 4:
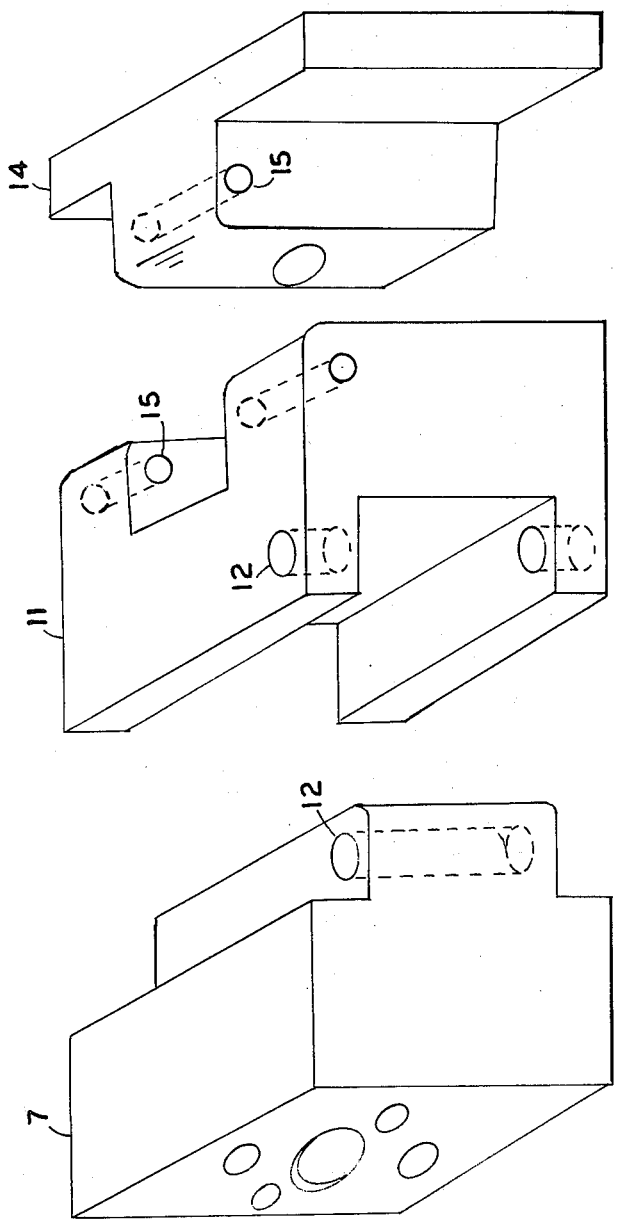
FIG. 4 is a perspective exploded view of the embodiment of the invention.

Referring to FIGS. 1 and 2, there is shown a fire truck 1, of the type having personnel carrying spaces 2 and 3, on each side behind the cab 4. These spaces accommodate one or two firemen and conventional fire trucks do not have any doors or enclosures to protect the firemen from falling out while the truck is making a turn. The bar 5 is mounted by means 6 of the present invention.

FIG. 3 shows a side view of an embodiment of the invention partially in section. The base member 7 is mounted on a permanent frame 8 by means of bolts 9 and 10. A connecting member 11 is pivotally mounted on the base member 7 by means of a pin 12. The bar member 13 is screwed onto a second connecting member 14, which is pivotally mounted on the first connecting member by means of the pin 15.

Note, that the first connecting member pivots about the pin 12 and rotates out of the plane of the paper in FIG. 3. The second connecting member is pivotally mounted on the member 15 and rotates perpendicularly to the rotation of the first connecting member, as will be further shown in FIGS. 4 and 5. The first connecting member 11 can only rotate in one direction, normally out of the plain of the paper in FIG. 3 and it is stopped from rotating in the other direction by construction of the mounting members.

Similarly the second connecting member 14 can only rotate up in FIG. 3 and is stopped in the other direction by the stop surfaces 11' and 14'. The device is mounted on a fire truck or other vehicle so that the bar can only rotate inwardly and upwardly and is stopped from rotating downwardly and outwardly beyond the stops.

The bar 13 is a hollow cylinder which is threaded at one end and connected to the member 14. A spring 16 is anchored to the far end of the bar at one end and a chain 17 is connected to the spring at the open end of the bar. The chain extends all the way to the connecting members through the central apertures in them and is anchored by the anchor 18.

Therefore, the bar may be lifted upwardly and/or inwardly so that the man can enter the truck and as soon as he lets go of it, the spring and chain will return to its stop position, which is the safety position, for preventing anyone from falling out of the truck. When the man desires to leave he merely lifts the bar upwardly or inwardly and descends from the truck.

FIG. 4 is a perspective exploded view of the embodiment of the invention.

The bar 13 may be made of aluminum or any other metal and is preferably covered with sponge rubber, the sponge rubber cover 20, is to minimize the shock of being thrown against the bar, for instance when the vehicle is making a sharp turn.

The bar can be any desired length depending upon the aperture that is necessary to close. Note, that the bar is only mounted at one end and it is not necessary to mount any fixed stops at the open end of the bar.

The invention is a safety bar that mounts across the jump seat opening. It is completely automatic. There are no hooks to latch or harnesses to buckle. It is spring loaded and returns to a safe position at all times.

OPERATION INSTRUCTIONS

To enter, simply push the bar away from you, step into the jump seat space, and the spring will gently return the bar to the original position across the jump seat opening.

If you are pushed or pressed against the bar while sitting or standing in the jump seat, the bar will not move. Helps to prevent falling from the truck.

To exit, simply lift the bar to the upright position and step out. It automatically, returns to its original position.

In order to help protect against injuries, the safety bar is encased in a heavy layer of foam. A bright yellow water repellent cover is fitted over this foam. All other parts are made of aluminum and stainless steel which make this product lightweight and rustproof.

Some installations may require a wedge shim (angle adjustor).

The safety bar is not limited to use on vehicles but may be used on boats, catwalks, fire escapes and other similar applications.

It is claimed:

1. Safety bar comprising:
   a base member adapted to be mounted on a permanent frame,
   a connecting member pivotally mounted on the base member for rotation in a first plane,
   a bar pivotally mounted on the connecting member for rotation in a second plane perpendicular to the first plane,
   the connecting member being rotatable in one direction from a stop position against the base member and the bar can only rotate at one direction from a stop position against the connecting member,
   the safety bar having a spring connected to hold the bar and connecting member in stop position.
2. Apparatus as in claim 1 having a chain anchored to the base member at one end and connected to the spring at its other end.

* * * * *